United States Patent
Yamamoto

[11] Patent Number: 5,968,444
[45] Date of Patent: Oct. 19, 1999

[54] METHOD FOR PRE-SHAPING OF PLASTIC FILMS USED IN CO-MOLDING PROCESSES AND IMPROVED PAINT FILM COVERED PARTS MADE THEREBY

[75] Inventor: Hiroaki Yamamoto, Brookville, Ohio

[73] Assignee: Green Tokai Co., Ltd, Brookville, Ohio

[21] Appl. No.: 08/857,552

[22] Filed: May 16, 1997

[51] Int. Cl.⁶ .......................... B29C 35/00; B29C 31/06; B60R 13/02
[52] U.S. Cl. .......................... 264/519; 264/511; 264/522; 264/260; 264/265; 264/266; 264/259; 156/242; 156/214; 156/244.16; 156/244.17; 156/277; 428/137; 428/131; 428/31; 428/195
[58] Field of Search .............................. 264/519, 511, 264/522, 260, 265, 266, 259; 156/242, 214, 244.16, 244.17, 277; 428/137, 131, 31, 195

[56] References Cited

U.S. PATENT DOCUMENTS

| | | | |
|---|---|---|---|
| 2,377,946 | 6/1945 | Leary | 264/522 |
| 3,484,518 | 12/1969 | Ignell | 264/519 |
| 4,902,557 | 2/1990 | Rohrbacher | 428/215 |
| 4,931,248 | 6/1990 | Willemin | 264/266 |
| 5,055,346 | 10/1991 | Rohrbacher | 428/216 |
| 5,113,479 | 5/1992 | Anderson et al. | 392/417 |
| 5,162,092 | 11/1992 | Klobucar et al. | 264/513 |
| 5,162,124 | 11/1992 | Hausler et al. | 425/384 |
| 5,284,693 | 2/1994 | Spain et al. | 428/172 |
| 5,405,675 | 4/1995 | Sawka | 428/195 |
| 5,514,427 | 5/1996 | Ellison et al. | 428/31 |
| 5,518,780 | 5/1996 | Johnson et al. | 428/406 |
| 5,571,473 | 11/1996 | Fujii | 264/510 |
| 5,571,581 | 11/1996 | Koizumi et al. | 428/31 |
| 5,599,608 | 2/1997 | Yamamoto et al. | 428/192 |
| 5,633,022 | 5/1997 | Myers | 425/384 |

*Primary Examiner*—William P. Watkins, III
*Attorney, Agent, or Firm*—Biebel & French

[57] ABSTRACT

Methods for pre-shaping paint film laminates and co-molding processes using such laminates are disclosed. The methods comprise the steps of providing (e.g., forming or procuring) a plastic paint film laminate, softening the paint film laminate with heat such that one or more localized portions of the member absorb more heat than the remainder, and deforming the plastic film member to form a pre-shaped article. The formation of different heat absorption areas on the paint film laminate is referred to as the provision of heat sink areas. These heat sink areas can be provided for example by surface coating of heat retention means such as black paint or ink pigments on localized areas of the surface of the laminate followed by uniform heating of the laminate in an oven or the like or the sheet can be heated in localized areas to a greater extent (i.e. time and/or temperature) than in remainder portions by the means of heat guns or the like. In either case, the result is that certain desired portions of the paint film absorb more heat than the remainder sections. The heat sink portions are deformed in either a pre-shaping step or in the molding step. When the heat sink portions are placed adjacent mold sections adapted to form a given surface continuity, the portions of the laminate bordering the heat sink portions exhibit gloss consistent with other show surfaces of the co-molded part.

5 Claims, 3 Drawing Sheets

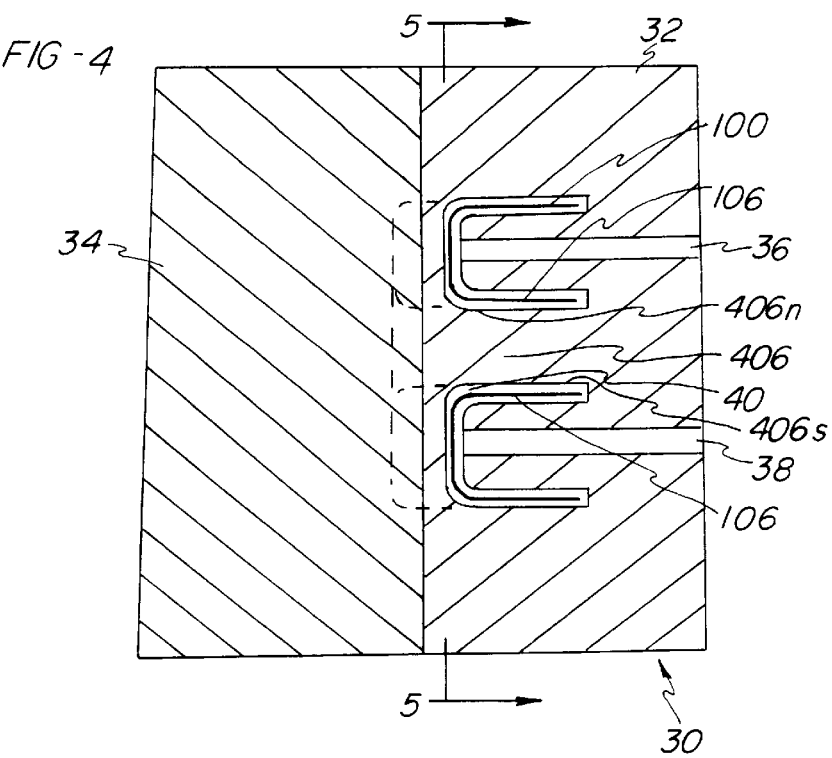
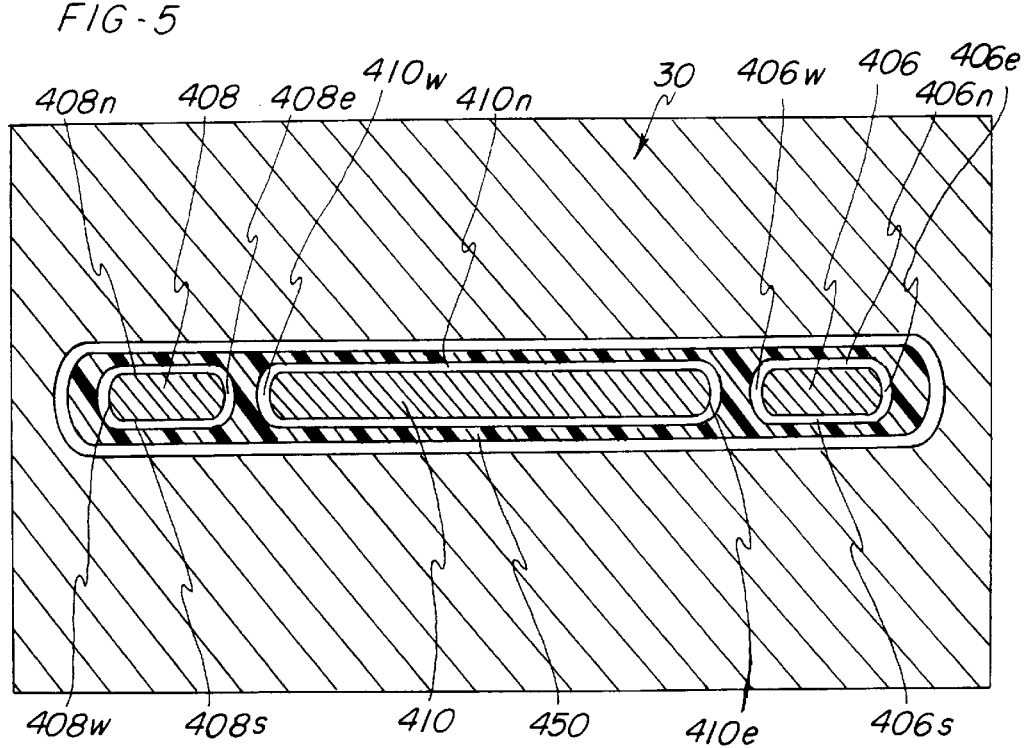

METHOD FOR PRE-SHAPING OF PLASTIC FILMS USED IN CO-MOLDING PROCESSES AND IMPROVED PAINT FILM COVERED PARTS MADE THEREBY

BACKGROUND OF THE INVENTION

1. Field of the Invention

The present invention relates to methods for pre-shaping plastic films that are used in co-molding processes to cover plastic substrates and to articles made by these methods.

2. Description of the Prior Art

A variety of injection molded parts are made and used for automobile body and trim parts. For example, bumpers, spoilers, body panels, doors, filler panels, wheel covers, dashboards, arm rests and other parts are commonly made by the injection molding of thermoplastic materials.

In order to provide a painted or other decorative surface for these parts, film lamination techniques are commonly employed. A paint film laminate is insert molded or as it is sometimes referred to, co-molded, with the desired thermoplastic to fuse the film over the injection molded substrate. The resulting injection molded film-plastic part is ready for assembly without subsequent painting.

The paint film laminate used in these insert molding techniques may comprise a backing sheet of about 0.020 inch (0.5 mm) in thickness to which paint, other pigment containing, or clear layers are adhered. Typically, the backing sheet comprises an extruded thermoplastic sheet. The paint or pigment layer may contain colored pigments or reflective flake pigments such as aluminum or mica flakes to provide for example a metallic finish.

The paint film may consist of a monocoat, a clear coat over a base coat or a clear coat and a base coat with interposed print or design. The paint film, including base coat, clear coat and print or design, if desired, may range from about 0.5–4 mil. (13–100 $\mu$m) in thickness.

Laminated paint films are well known in the art and are available, for example, from Avery Dennison Decorative Films Div. of Schererville, Ind., or Decorative Products of Charlotte, N.C. For example, laminated paint films are detailed in U.S. Pat. No. 5,514,427. The entire disclosure of this patent is incorporated by reference herein. The films are typically provided in a roll, unwound and then "preformed" to a size and shape approximating that of the final injection molded film-plastic part. The preforming process may comprise compressing and heating the film within a mold cavity to impart the desired basic shape to the film.

Preforming may also be accomplished by heating the film and then shaping it over a pattern block which generally corresponds to the size and shape of the finished injection molded part. A vacuum may be drawn from a plenum communicating with air channel means in the pattern block to draw the paint film over the pattern block and conform it to the desired shape.

The preform is next usually trimmed to a proper size and placed along the cavity side of an injection mold with the painted side or "show" side thereof facing the mold cavity surface. In some instances, the preform may be placed along the core side of the mold. The mold is then clamped and the desired molten resin is injected into the mold cavity. Heat and pressure conditions in the mold partially melt the backing sheet and a melt bonding or fusion of the injected resin and the backing sheet of the film occur. Injection molds used for these processes are rear or edge gated so that the molten resin is directed along the backside of the film.

Techniques for preforming paint film laminates and insert molding film-plastic parts are disclosed in U.S. Pat. No. 5,599,608. The disclosure of this patent is incorporated herein by reference.

Although the prior art lamination techniques provide significant advantage, they are not without problem. One problem is a lack of gloss consistency on the show surface of the film laminate after it is fused to the plastic part. For example, when the paint film laminate is preformed to approximate the shape of a part having a surface discontinuity such as a boss, recess, aperture or cut out portion, the portion of the film in the neighborhood of the surface discontinuity is deformed (e.g., elongated) more than the surrounding portion of the film. This adversely affects gloss uniformity of the show surface. The paint coating in the areas surrounding such discontinuity is duller than the other show surfaces. The result is that a co-molded paint film covered plastic part is formed wherein there is a substantial difference in gloss on the show side of the part.

Accordingly, there remains a need in the art to improve on the existing methods for preforming plastic film members prior to co-molding thereof with the requisite plastic so as to provide more uniform gloss characteristics on the show side of co-molded plastic parts.

SUMMARY OF THE INVENTION

The method comprises the steps of providing (e.g., forming or procuring) a plastic film member, softening the plastic film member with heat such that one or more localized portions of the member absorb more heat than the remainder, and deforming the plastic film member to form a pre-shaped article. The formation of different heat absorption areas on the paint film laminate is referred to as the provision of heat sink areas. These heat sink areas can be provided for example by surface coating of heat retention means such as black paint or ink pigments on localized areas of the surface of the laminate followed by uniform heating of the laminate in an oven or the like, or the sheet can be heated in localized areas to a greater extent (i.e. time and/or temperature) than in remainder portions by the means of heat guns or infrared heaters or the like. In either case, the result is that certain desired portions of the paint film absorb more heat than the remainder sections.

The higher temperature of the localized portions or heat sink results in greater pliability of the plastic film member in these regions. These areas may be then be easily stretched or deformed in the co-molding process. Neighboring sections of the film member during the molding process will stretch less and will exhibit a uniform high gloss surface.

The invention will be further described in conjunction with the following detailed description, the accompanying drawings and the appended claims.

BRIEF DESCRIPTION OF THE DRAWINGS

FIG. 1A is a magnified view of a portion of the bumper part of FIG. 1, showing the right hand fog light cut out portion of the bumper part;

FIG. 4 is a cross-sectional view of a mold cavity used to injection mold the bumper part of FIG. 1, taken along the plane designated by the lines and arrows 4—4 of FIG. 3;

FIG. 5 is a top plan view of a sheet of paint film laminate that will be co-molded with desired thermoplastic to form the bumper part shown in FIG. 1.

The invention will be further described in the following detailed description of a preferred embodiment.

DETAILED DESCRIPTION OF THE PREFERRED EMBODIMENT

Figure 1:
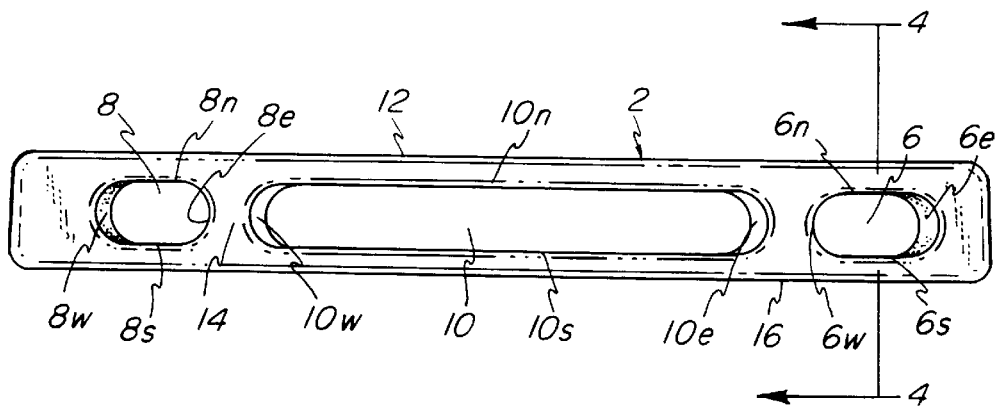
FIG. 1 is a front elevation of a paint film laminate covered bumper part made in accordance with the invention.

Turning first to FIG. 1, there is shown automobile or truck bumper part 2. This part is composed of a plastic substrate with paint film laminate disposed over and covering the desired show surfaces of the bumper. In many cases, the paint film layer comprising the show surface of the part is chosen to exactly match the color of the auto or truck body. The phrase "paint film laminate" as referred to in the specification and claims broadly means laminated paint pigment, metallized flake pigment or other laminated films containing a decorative show surface as described in aforementioned U.S. Pat. No. 5,514,427.

As shown, bumper 2 comprises a front show surface 14 and a plurality of surface discontinuities which consist of generally oval fog light cut out portions 6, and 8 laterally offset from a centrally disposed larger oval cut out section 10 that may for instance be open or cut out to cover an air intake or grill section of the engine. The bumper also comprises a top surface 12 and bottom surface 16.

The phrase "surface discontinuities" as herein used throughout the specification and claims designates a raised or depressed area of the part including surface protuberances such as a boss part, ridges, and convexities, cavity portions of the part, cutaway, cutout and aperture portions of the auto or truck part. In the particular embodiment chosen for illustration, the discontinuities are represented as apertures or cut-outs for fog lights, grills and the like. The artisan will readily appreciate that the invention as described and claimed herein can be easily adapted for use in situations where others of such discontinuities are present in the part.

Figure 2:
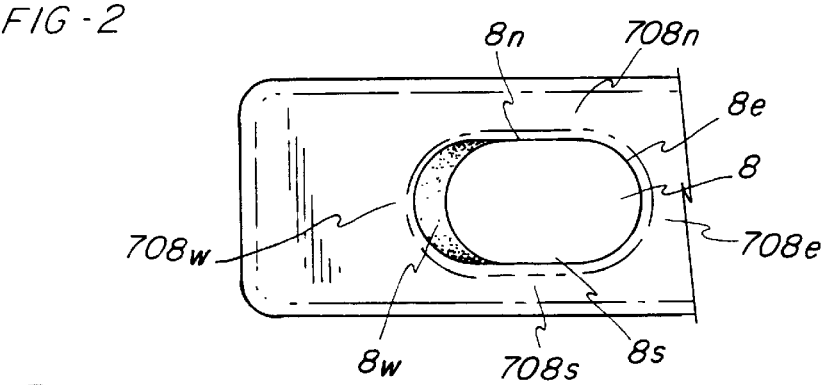
FIG. 2 is a top plan view of the bumper part shown in FIG. 1.

In FIG. 1, fog light cut out 6 is surrounded by vicinal areas 6n, 6s, 6e and 6w which together define the generally cylindrical or oval wall surrounding the fog light cutout. Similarly, grill cut out 10 includes neighboring surfaces 10, 10s, 10e, and 10w. The cut out 8 includes neighboring surfaces 8n, 8s, 8e and 8w. As shown in FIG. 1, these surrounding or neighboring surfaces of the discontinuities extend from front show surface 14 to the rear of the bumper 2. In FIG. 2, surfaces 6e, 6w, 10e, 10w, and 8e and 8w are shown in phantom. These vicinal or neighboring surfaces will either be covered during subsequent steps in the assembly, by a light, grill, or other functional or ornamental assembly and will not be shown on the show side of the bumper part, or the surfaces will be recessed and hence will not be directly viewable. Accordingly, all of these surfaces may be referred to as non-show surfaces or B surfaces of the part.

As previously mentioned, it is desirable to pre-shape the paint film laminate prior to its insertion into the mold cavity and subsequent molding step. This is usually accomplished by heating the paint film laminate sheet to a temperature approximating its softening paint (e.g. 300° F. to 400° F.) and then mounting the heated sheet on a shaped vacuum block or similar shape imparting form or pattern so that it will generally conform to the desired finished part shape. The film sheet can be heated in an oven or heated by heater guns and the like. A vacuum may be drawn through the vacuum block to gently grasp the paint film laminate, pulling it against the block and imparting the desired pre-shape to the paint film laminate prior to its insertion into the mold cavity.

Turning now to FIG. 5, there is shown a sheet 100 of paint film laminate. As shown, the sheet is in show position with its rear face 102 (i.e. the non-show face) not exposed. The paint film containing or show side is shown in this figure.

In accordance with the invention, heat sink areas 106, 108, and 110 are provided in the sheet 100 in those areas that will form the cut out areas 6, 8, 10 of the bumper part shown in FIG. 1. The remaining area of the sheet is referred to as the major or remainder surface area and numbered 120. The heat sink areas 106, 108, 110 are made large enough so that they are approximately equal to that portion of the sheet that will ultimately be cut out 106a, 108a, 110a (usually prior to the co-molding step) and the non-show or B surface areas needed to form the neighboring surfaces 6n, s,e,w; 8n,s,e,w; or 10n,s,e,w. Stated differently, each of the heat sink areas is large enough to cover the portion of the sheet that may be cut out or removed plus those surrounding non-show or B areas of the cut out.

Based on preliminary studies, it is preferred to form the heat sink areas via surface coating of heat absorptive black paint or ink on the desired areas of the sheet 100. It is also possible that other heat retention aids such as heat retentive powders, and metal linings may be provided to form the heat sink areas. Additionally, a localized pre-heating of the desired regions of the sheet may be made. All of these are referred to as heat sinks.

Although the specialized heat sink treatment such as black ink or pigments or localized heating are applied to one side of the sheet, the artisan will appreciate that the increase in heat absorbed in those specially treated areas will easily be conducted through the thickness of the sheet to its opposite side.

The overall point is that heat sink areas are provided on the sheet. These heat sink areas absorb more heat during sheet heating and therefore attain a higher temperature than surrounding non-heat sink areas. When the thus treated sheet is pre-shaped on a vacuum block or other form, the heat sink regions of the sheet readily deform, stretching easily over the desired surface discontinuity imparted by the vacuum block or form. However, and with further attention to FIG. 5 the areas of the film laminate bordering the heat sink areas are not significantly deformed and quite surprisingly they possess surface gloss characteristics that are not substantially impaired. Accordingly, they closely match the gloss characteristics of the type A paint film side or show side of the remainder of the paint film laminate.

Turning again to FIG. 5, regions of the paint film laminate that surround or border the heat sink areas are numbered 708n, s, e, w; 710n, s,e,w; and 706n,s,e,w respectively. These areas are referred to as the gloss retaining show side border areas surrounding the heat sink areas and as aforestated show uniform gloss. They would be classified as type A show surfaces similar to the remaining show side surfaces of the laminate covered part.

Although applicant is not to be bound to any particular theory of operation of the invention, it is thought that provision of the heat sink areas on the paint film laminate sheet 100 provides localized portions of the sheet, where desired, that exhibit increased elasticity compared to the other areas of the sheet. In turn, it is thought that this results in a state wherein the color or decorative pigments in the paint film layer of the laminate surrounding the heat sink are not substantially altered, stretched or dislocated as the requisite surface is formed during the pre-shaping and ultimate co-molding steps.

Figure 6:
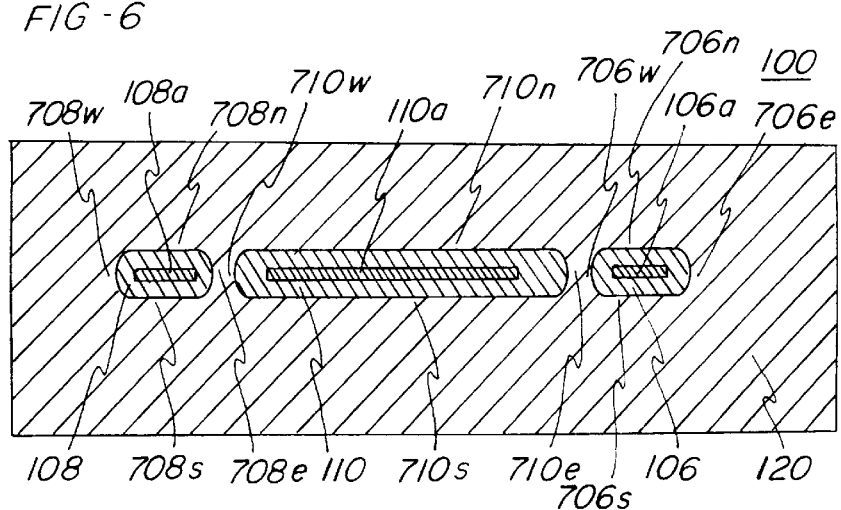
FIG. 6 is a perspective view of a pattern block with overlying paint film laminate sheet used to preshape the paint film laminate into the desired shape ready for the co-molding process.
Figure 7:
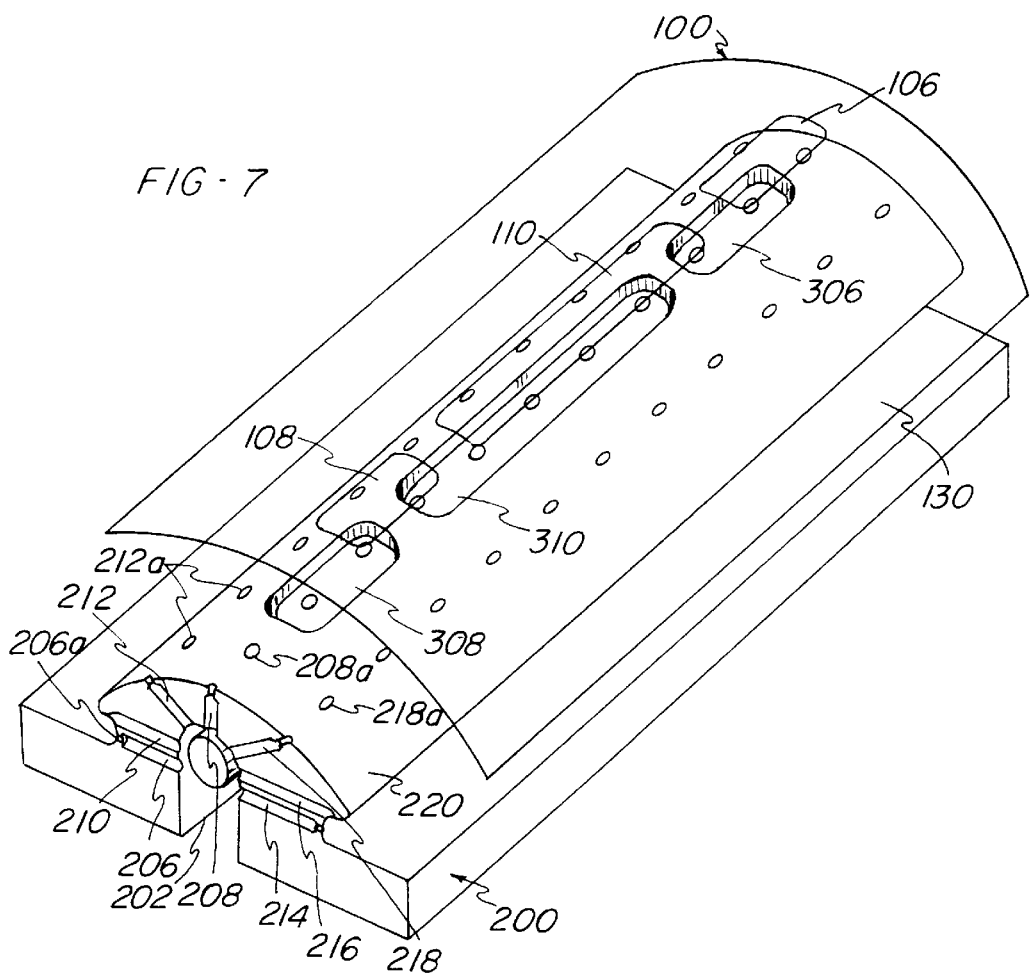

Turning now to FIG. 6, the heated paint film laminate sheet 100 is placed over vacuum preforming block 200. The surface contour of the block 200 is shaped so as to roughly correspond to the surface contour of the plastic part to be made. In this case, the surface of block 200 approximates the surface contour of the bumper shown in FIGS. 1 and 2.

Block 200 comprises plenum 202 and channels 206, 208, 210, 212, 214, 216, 218 communicating therewith. The channels terminate in corresponding sets of apertures (212*a*, 208*a*, 218*a* shown) formed in the surface of the block. A vacuum source (not shown) is connected to the plenum and draws a vacuum through the apertures so that the pre-heated sheet 100 will be drawn against the surface pattern to impart the desired pre-shaping to the laminate sheet.

As shown, the surface 220 of block 200 comprises recessed portions 308, 310 that roughly correspond in area to the heat sink portions 106, 108, 110 formed in the laminate sheet (see FIG. 5) that will be superposed over the block 200. These portions 306, 308, 310 correspond to those areas of the part 2 that will form the cut outs 6, 8, and 10 and their respective neighboring surface areas of the co-molded plastic part.

After the desired pre-shape is imparted to the laminate sheet, portions 106*a*, 108*a* and 110*a* of the heat sink areas (FIG. 5) may be removed, if desired by cutting or slitting. Then the sheet is ready for the co-molding operation which will be described in conjunction with review of FIGS. 3 and 4.

Figure 3:
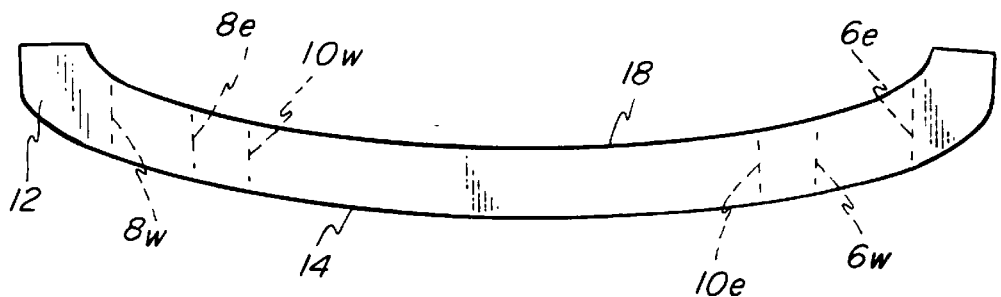
FIG. 3 is a transverse cross-sectional view of a mold cavity used to injection co-mold the bumper part of FIG. 1 shown at that portion of the mold cavity corresponding to the bumper part at location of the lines and arrows 3—3 of FIG. 1.

Turning first FIG. 3, a transverse cross-sectional view of a rear gated two part, male-female mold is shown that can be used to make the bumper shown in FIG. 2. The mold 30 comprises male mold member 32 and female member 34 with gates 36, 38 extending into the mold cavity 40. Paint film 100 is positioned in the cavity 40 such that pressure from the injection molded plastic from gates 36, 38 will force the show side 130 of the film against the desired mold cavity surfaces to form the desired show surface of bumper 2. The male mold member includes a solid mold portion 406 which will form and therefore corresponds to cut-out 6 of the bumper part (FIGS. 1 and 2). Sides 406*n* and 406*s* of the male mold cavity are provided and correspond to bordering non-show surfaces 6*n* and 6*s* of the bumper part (FIG. 1 and 2). Heat sink portion 106 of the paint fill laminate 100 is positioned in the mold cavity adjacent sides 406*n* and 406*s* so that non-show surfaces 6*n* and 6*s* of the bumper part are covered by heat sink portions of the paint film laminate.

FIG. 4 shows a front end view of the mold. Here the mold 30 includes solid portions 406, 408, and 410 that will respectively form the surface discontinuities, namely cut-outs 6, 8, and 10 of the bumper part. Side portions 406*n*, *s*, *e*,*w*; 408*n*, *s*, *e*, *w* and 410 *n*, *s*, *e*, *w* are attached to solid portions 406, 408 and 410 respectively and will form the non-show surfaces 6*n*, *s*, *e*, *w*; 8*n*, *s*, *e*, *w*, and 10*n*, *s*, *e*, *w* of the bumper part cut-outs. All of these surfaces will be composed of heat sink treated sections of the paint film laminate.

It is apparent then from review of FIG. 4 that three major mold sections are provided. The first sections correspond to the desired surface discontinuity, in this case, the cutouts, and are numbered 406, 408, 410. The second mold sections, upon molding, form the non-show surfaces that neighbor and are contiguous with the discontinuities 406, 408, 410. These are specified as mold surfaces 406*n*, *s*, *e*, *w*; 408*n*, *s*, *e*, *w*; and 410*n*, *s*, *e*, *w*.

The third section of the mold includes the surfaces provided along the mold cavities other than the surfaces 406, 408, 410, 406*n*, *s*, *e*, *w*; 408*n*, *s*, *e*, *w*; and 410*n*, *s*, *e*, *w*. This third section is depicted generally as remainder 450. Remainder 450 can be considered as the sea or show surface in which discontinuities 406, 408 and 410 and their respective neighboring sides are disposed.

Due to the alignment of the heat sink portions of the paint film with the neighboring non-show surfaces of the mold 406*n*, *s*, *e*, *w*; 408*n*, *s*, *e*, *w* and 410*n*,*s*, *e*, *w*, upon molding of the part fusing of the injected thermoplastic with the backing portion of the paint film laminate, and subsequent separation of the part from the mold, substantial gloss uniformity may be seen between the show surfaces surrounding the discontinuities and the remainder portions of the show side of the paint film covered part.

The overall method therefore provides improvement in the formation of paint film laminate covered plastic parts and the like which parts are contoured to have surface discontinuities therein. The paint film laminate is provided with one or more localized heat sink areas that are positioned in the laminate sheet in locations that will correspond to a surface discontinuity in the finished, molded part.

Turning now to FIG. 1A, there is shown a magnified view of the fog light cut out portion 8 of the bumper part. Here, the cutout 8 is provided. A fog lamp will be inserted therein during assembly of the vehicle. Surfaces 8*n*, 8, *s*, 8*e*, and 8*w* will not therefore be seen after this assembly step. These surfaces were formed during the co-molding process, with heat sink surfaces covering the underlying plastic located thereat. Neighboring show surfaces 708, *n*, *s*, *e*, *w* are visible and exhibit uniform gloss luster and retention when compared to the other film covered show surfaces of the part. The surfaces 708*n*, *s*, *e*, *w*, and remainder, show side areas will be classified as type A show surfaces.

The thermoplastic material that is to be co-molded with the paint film laminate may be selected from any one or more polymer types. Needless to say, the thermoplastic polymer should be chosen to provide the desired physical properties such as weight, stiffness etc. to the finished co-molded part. Suitable thermoplastics include for example, polyvinyl chloride, polycarbonate, polystyrene, acrylonitrile-butadiene-styrene, polyethylene, polypropylene, polyethylene tetrephthalate-glycol, nylon, and RIM urethanes. Polyolefin homopolymers and copolymers (ionomers, etc.) are inexpensive thermoplastic resins which have excellent molding properties and may also be mentioned as being suitable for use. Additionally certain thermoplastic elastomers such as the TPO's (thermoplastic olefin) elastomers may be employed.

The preceding description and accompanying drawings are intended to be illustrative of the invention and not in any limiting sense. Various other modifications and applications will be apparent to those skilled in the art without departing from the true spirit and scope of the invention as defined literally by the claims and their equivalents.

What is claimed is:

1. Method of providing a uniform gloss on a show side of a paint film laminate covered plastic part of the type having a surface discontinuity therein and show side neighboring surface areas surrounding said surface discontinuity, comprising:

a) providing a paint film laminate sheet having a face surface for covering said surface discontinuity and said show side neighboring surfaces, said paint film laminate sheet also including a thermoplastic backing surface;

b) providing a heat sink area on said paint film laminate sheet by selectively coating a portion of said laminate with a heat retention member; exposing said paint film laminate sheet to a heat source to provide for increased pliability of said heat sink portion of said paint film laminate, c) providing a mold having a mold cavity therein, said mold cavity including a first mold section contoured to form said discontinuity of said part, and a second mold section adjacent said first mold section for forming said show side neighboring surface areas of said part;

d) positioning said paint film laminate sheet in said mold with said heat sink area of said paint film laminate adjacent said first mold section; and e) injecting molten plastic into said mold cavity and against said thermoplastic backing surface of said paint film laminate whereby said heat sink area of said paint film laminate will stretch over and bond with said plastic along said first mold section to cover said at least one surface discontinuity of said plastic part and said paint film laminate sheet will cover and bond over said plastic along said second mold section whereby uniformity of said gloss along said neighboring show side surface areas is improved.

2. Method as recited in claim 1 wherein said heat retention member comprises a black paint or ink.

3. Method as recited in claim 2 wherein said heat retention member comprises black paint.

4. Method as recited in claim 1 wherein said heating comprises heating said laminate sheet to about the softening point of said thermoplastic backing sheet.

5. Method as recited in claim 4 wherein after said heating step and prior to said step (c) said method comprises pre-shaping said paint film laminate.

* * * * *